(12) United States Patent
Borysowicz et al.

(10) Patent No.: US 6,796,147 B2
(45) Date of Patent: Sep. 28, 2004

(54) APPARATUS FOR CONTROLLING GLASS MELTING AND/OR REFINING FURNACES

(75) Inventors: Alicja Borysowicz, Evry (FR); Stéphane Lepert, Morangis (FR)

(73) Assignee: Stein Heurtey (FR)

( * ) Notice: Subject to any disclaimer, the term of this patent is extended or adjusted under 35 U.S.C. 154(b) by 0 days.

(21) Appl. No.: 09/343,684

(22) Filed: Jun. 30, 1999

(65) Prior Publication Data

US 2002/0124598 A1 Sep. 12, 2002

(30) Foreign Application Priority Data

Jul. 29, 1998 (FR) ............................................ 98 09706

(51) Int. Cl.⁷ ................................................ C03B 5/24
(52) U.S. Cl. ........................ 65/162; 65/158; 65/DIG. 13
(58) Field of Search ............................ 65/29.11, 29.18, 65/29.19, 29.21, 158, 162, DIG. 13; 706/1, 2, 3, 4; 700/30, 44, 45, 274

(56) References Cited

U.S. PATENT DOCUMENTS

| | | | | |
|---|---|---|---|---|
| 4,409,012 A | * | 10/1983 | Miller | 65/29.18 |
| 4,927,357 A | * | 5/1990 | Yap | 432/22 |
| 5,272,621 A | * | 12/1993 | Aoki | 364/165 |
| 5,357,879 A | * | 10/1994 | Shiono et al. | 110/118 |
| 5,693,110 A | * | 12/1997 | Iwaihara et al. | 65/29.11 |
| 5,754,452 A | * | 5/1998 | Pupalaikis | 706/914 |
| 5,822,740 A | * | 10/1998 | Haissig et al. | 706/3 |

FOREIGN PATENT DOCUMENTS

| | | | |
|---|---|---|---|
| EP | 0 748 773 | | 12/1996 |
| EP | 0 901 053 | * | 4/1999 |
| JP | 04-132628 | * | 5/1992 |
| JP | 07-017720 | * | 1/1995 |
| JP | 07-017721 | * | 1/1995 |

OTHER PUBLICATIONS

Victor, et al, "A Computer Vision System for the Characterization and Classification of Flames in Glass Furnaces", IEEE Transactions on Industry Applications, vol. 29, No. 3, May/Jun. 1993.*

* cited by examiner

*Primary Examiner*—Sean Vincent
(74) *Attorney, Agent, or Firm*—Connolly Bove Lodge & Hutz LLP

(57) ABSTRACT

An analysis and control device for glass furnaces is of the fuzzy-controller type and uses a control algorithm which receives information relating to the operation of the furnace coming from sensors and from detection means provided on this furnace, as well as set point values input manually by operators. This control algorithm delivers control signals to the various actuators and control means of the furnace. A predictive system, of the neural- and/or fuzzy-type is included which depends on the state of the furnace and on the information about the change in production over time. It defines the various set point values to be assigned to all the furnace actuators, so as to ensure optimum operation for each production phase. The set point values constitute input values for the fuzzy-logic algorithm which controls the furnace.

7 Claims, 1 Drawing Sheet

APPARATUS FOR CONTROLLING GLASS MELTING AND/OR REFINING FURNACES

FIELD OF THE INVENTION

The present invention relates to the control of glass melting furnaces for the purpose of automating their operation, including during transient phases, of improving the quality of the glass produced and of reducing the consumption of fuels as well as the amount of pollutants that are discharged. This invention may be applied to any type of glass melting and/or refining furnace, namely firing, end-fired or cross-fired, electric or mixed (flame+electric) furnaces, and to any type of glass produced.

BACKGROUND OF THE INVENTION

The present invention therefore aims to provide a device for controlling the melting of the glass batch, of the fuzzy control type, designed so as to automatically carry out all or some of the set of operations for controlling the operating parameters of the furnace as well as all or some of the set of operations for operating the actuators which control the equipment of the furnace, on the basis of the strategies that an operator carrying out these operations manually would employ.

It is known that the control of a glass furnace is a particularly tricky and complicated operation, especially because of the very large number of parameters involved in controlling the furnace and the considerable inertia of these furnaces, as well as the very slow variation in the parameters and phenomena involved in controlling the melting of the glass.

It follows that the control of glass furnaces often remains empirical, being generally limited to adjustment of the furnace crown temperatures by acting manually on control devices which act on the actuators which control heating and cooling equipment of the furnace and on the equipment for feeding it with the glass batch. These actions generally rely on the experience of the operator as well as on his analysis of how the furnace and the melt hat it contains are behaving, in particular his visual estimation of the conditions in which the melting and/or refining of the glass composition inside the furnace is/are taking place.

It follows from this empiricism that the principle on which to make decisions about actions to be taken with regard to a given situation in the furnace is difficult to formalize.

To solve this problem, operators generally draw up tables giving the status of all the measurable parameters of the furnace, in a given production configuration, so as to try to reproduce these parameters in a similar production situation. The number of parameters involved and she lack of knowledge about their relationship or interactions make this operation complicated during steady operation of the furnace. It is even more difficult during transient phases, such as a change of production or a change of colour, or example. Thus it may be imagined that a glass furnace can only be controlled by skilled operators with a great deal of experience.

The decisions taken therefore often depend on the experience or common practices of each operator and it follows that any generalization of the furnace control principles is extremely difficult. The operators, in their control of the furnace, work to within a safety factor with respect to the optimum operating conditions so as not to risk degrading the quality of the glass, this procedure limiting the efficiency or performance of the furnace.

The manual mode of controlling the glass furnace proves even more limited when managing the transient phases which correspond to changes in tonnage of the furnace or to changes in the type or color of the glass, or other such changes.

Reference will now be made to FIG. 1 of the appended drawings, which shows, diagrammatically, in perspective and with partial cut-away, one embodiment of a glass melting furnace to which the present invention may be applied.

This furnace, in a known manner, mainly consists of a tank 1, made of refractory materials, in which the glass 2 is melted. This tank has side walls 3 made of refractory materials and a crown 4. The chamber of the furnace is heated using burners 5 which are set in at least one of the walls of the furnace.

The melted and refined glass is temperature-conditioned, in a zone of the furnace generally called a working chamber 6, and is then delivered to the forming equipment represented schematically by the reference 7, which may be of any known type, especially machines for forming hollow glassware (bottles) or equipment for forming glass sheet for the purpose of obtaining flat glass (window glass).

The glass batch is introduced into the furnace via one or more devices of the batch charger 8 type, which are set into one or more of the walls of the furnace, these devices depositing and pushing the glass batch on the surface of the molten glass, in the form or independent batch piles or of a blanket 9 of defined composition.

The walls 3 of the furnace furthermore include a number of openings (not shown in the drawing) so as to allow the operators to observe the melting of the glass in the furnace chamber, the shape of the burner flames, the spreading of the batch on the surface of the glass melt, the operation of the bubblers, etc.

The furnace furthermore includes a number of sensors and detection means for measuring the operating parameters of the furnace and of its peripheral equipment, such as the working chamber 6, the fuel and oxidizer circuits, the fume circuits, the cooling circuits, all the fluid circuits, as well as the positions of the actuators (control valves, devices for varying the electrical power, etc.), position-control members, and other such devices. The values thus measured correspond to each space of the observed quantity or parameter (temperatures, flow rates, pressures, speeds, positions, etc.).

BRIEF DESCRIPTION OF THE INVENTION

Starting from this state of the art, the present invention is intended to provide a device for monitoring and controlling the melting and/or refining of the glass batch in a glass melting furnace, which automatically carries out all or some of the set of operations for controlling the operating parameters of the furnace as well as all or some of the set of operations for operating the actuators of the furnace, on the basis of the strategies that an operator carrying out these operations manually would employ. The device forming the subject of the present invention is characterized in that it comprises:

an analysis and control device, of the fuzzy-controller type, using a control algorithm of the fuzzy-logic type which receives all the information relating to the operation of the furnace coming from the sensors and from the detection means provided on this furnace, as well as the set point values input manually by the operators, this control algorithm delivering control signals to the various actuators and control means of the furnace and, a predictive system, of the neural- and/or fuzzy-type, which, depending on the initial state of the furnace and of its parameters and on the modification of at least one of the said parameters, determines the predicted change over time of the state of the furnace and of its parameters, this predicted change in the state of the furnace being used as input data for the fuzzy controller which determines the new set point values for the furnace actuators which are necessary for maintaining optimum operation of the furnace compatible with the defined objectives.

This predicted change in the state of the furnace and of its parameters forms part of the input data for the controller of the fuzzy-logic type which will determine the set points that have to be applied to the various actuators for operating and controlling the equipment of the furnace so as to maintain the objectives defined by the operator, such as, for example, the crown temperatures or the quality of the glass produced.

According to a second embodiment of the control device forming the subject of the present invention, this device furthermore includes a learning or computing device which is used during the learning phase of the neural- and/or fuzzy-type predictive system, i.e. during the phase of acquisition or the operating laws of the furnace. According to the invention, this learning, determining or computing device uses a computer model of the numerical-model type making it possible to define the laws governing the operation of the furnace, either from the learning phase of this predictive system, on the actual furnace, or by simulating the operation of the furnace using a mathematical model.

According to a preferred embodiment of the device forming the subject of the invention, this device furthermore includes a means for the acquisition and processing of the image of the inside of the furnace, operating in the visible, infrared or other spectrum, the means possibly consisting of a system of video cameras positioned in the furnace in order to observer zones corresponding to a phenomenon relating to the melting and/or to the refining of the glass, the images thus obtained then being processed so as to obtain information relating to the observed phenomenon, this information being shaped for the purpose of being introduced as input data for the furnace control algorithm so as to monitor and control the observed phenomenon.

Other features and advantages of the present invention will emerge from the description given below with reference to the appended drawing which illustrates one embodiment thereof, given by way or example and devoid of any limiting character.

DETAILED DESCRIPTION OF THE INVENTION

Figure 1:
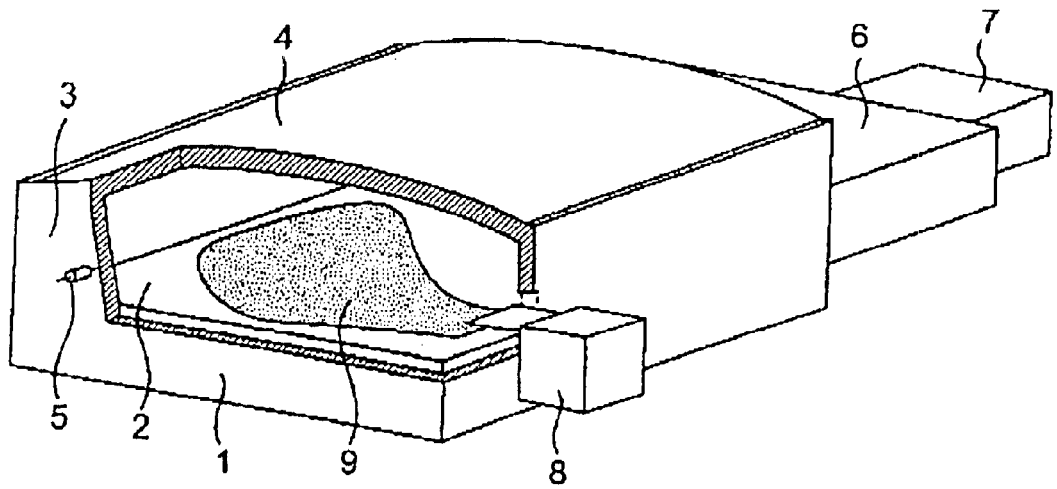
FIG. 1 is a diagrammatic view, in perspective with partial cut-away, showing an example of a glass melting furnace, described above, to which the present invention may be applied.
Figure 2:
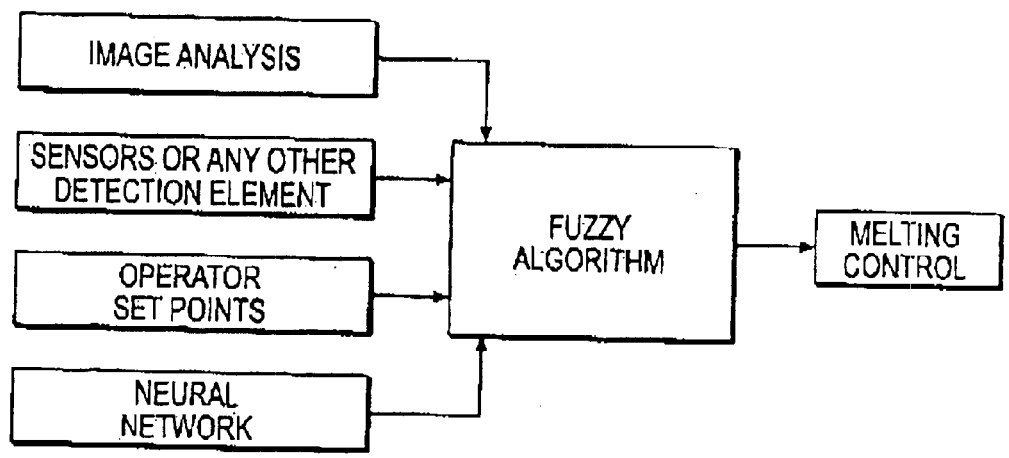
FIG. 2 is a flow diagram illustrating the control device forming the subject of the present invention.

As explained above, the device according to the invention provides a system for monitoring and controlling the melting and/or refining of the glass batch, making it possible to automatically carry out all or some of the operations for controlling the operating parameters of the furnace and for operating its actuators on the basis of the strategies employed by an operator carrying out these operations manually.

According to this device, the following are employed:
an analysis and control device of the fuzzy-controller type and
a predictive device of the neural- and/or fuzzy-type.

This device may furthermore include a learning or computing system of the mathematical-model type and a device for the acquisition and processing of the image of the inside of the furnace.

As will be understood, the control device forming the subject of the present invention relies on a control algorithm of the fuzzy-logic type, which receives the following information (this enumeration is in no way limiting):

the temperature information obtained from temperature sensors set into or on the glass melting furnace;

the information relating to the flow rates and pressures of the various fluids used by the furnace (fuel, oxidizer and fume, as well as their compositions, cooling, electricity) and the measurements of the consumption of each fluid, all this information being delivered by sensors or detection devices provided in or on the furnace;

the information regarding the position of the various furnace actuators (control valves, devices for varying the electrical power, batch low rate, etc.);

the information from end-of-travel sensors for the furnace equipment;

the set point values which are manually input by the operators into the furnace control system;

the information relating to the quality of the glass produced, which information may be acquired at any point in the manufacturing process;

the information from the neural network, as will be described in detail below; and the information coming from the analysis of the images of the inside of the furnace, as will be explained below.

The control algorithm of the fuzzy controller delivers control signals, especially for the following elements (without this enumeration having any limiting character):

the combustion equipment (burners with their fuel and oxidizer feed equipment);

the electrical equipment for heating or adjustment;

the glass refining devices (bubblers, boost melters, etc.); and the furnace control systems.

The output data from this algorithm is delivered depending on the processing of the abovementioned input information and this processing is carried out according to the principles of fuzzy logic depending on the specific requirements of the system and according to the rules which govern it. These rules may either be input manually, when programming the system, or acquired by the fuzzy logic during a learning phase, directly or the furnace to be controlled.

As will be understood, the fuzzy controller gathers all the information relating to the operation of the furnace, coming from the sensors and detection systems provided in the later, using a fuzzy logic algorithm which reproduces the principles and the know-how of the operators so as to determine the most appropriate furnace actuator or combination of furnace actuators on which it is necessary to act in order to have optimum furnace control.

The neural- and/or fuzzy-type predictive system makes it possible, depending on the instantaneous state of the furnace and on modifications to the materials which are fed into it or on programmed modifications of at least one of its parameters, to determine the corresponding state of the furnace over the hours following the application of these modifications. In other words, this system makes it possible, depending on the state of the furnace and on the information relating to the change in the production over time, to determine, in a predictive manner, the change in the state of the furnace and the values that its various parameters will cake for this step.

Thus, depending on the predicted change in the parameters describing the state of the furnace, the said predictive system will define the various set point values that have to be assigned to all the furnace actuators so as to ensure optimum operation of the furnace for each production phase. Depending on the various parameters for the production runs to be made, this predictive system determines the changes in the values of the various set points so as to optimize the transient phases. This optimization takes into account the furnace requirements, requirements relating especially to the quality of the end-product, to the operating conditions of the furnace, these being within the safety limits of its components, to the values of the consumption of the various types of energy necessary for operating the furnace, to the discharge of pollutants, to the availability of the batch materials, etc.

All these constraints are taken into account by this predictive system which, depending on the possible situations of the furnace, as defined, determines the optimum control strategy which is put into effect by predicted set point values to be assigned to the various furnace actuators. These set point values constitute input data for the fuzzy-logic furnace control algorithm.

The control device forming the subject of the invention may also include a learning, determining or computing device which is used during the learning phase of the neural- and/or fuzzy-type predictive system, i.e. during the phase of acquisition of the operating laws of the furnace. This device, which may use a computer model of the numerical-model type, makes it possible to define the laws governing the operation of the furnace either from the learning phase of the predictive system, on the actual furnace, or by simulating the operation of this furnace using a mathematical model.

Among the information delivered to the control algorithm for the fuzzy controller is that relating to the image of the inside of the furnace. According to one of these aspects, the control device forming the subject of this invention includes means for the acquisition and processing of the image of the inside of the furnace. For this purpose, the inside of the furnace is scanned by an image-acquisition device which may consist of one or more video cameras operating in the visible, infrared or other spectrum. These cameras are positioned in the walls or in the crown of the furnace so as to provide surveillance of one or more zones corresponding to a phenomenon relating to the melting and/or to the refining or the glass. These phenomena may be:

the distribution of the batch fed into the furnace, of the position of the batch piles, of their speed and any other parameter relating to the appearance of the batch as it melts on the surface of the glass melt;

the operation of the burners, especially the shape and the distribution of the flames from the burners inside the furnace, so as to control the distribution of thermal power to the glass and to limit the wear of the super-structure refractories, such as the refractories of the walls and the crown of the furnace;

the movement of the convection currents in the glass melt, especially for the purpose of optimizing the melting and/or refining of the glass in order to control its quality and to limit the wear of the refractories making up the tank for holding the glass in the furnace;

the operation of the bubblers; and any phenomenon that may be observed inside the furnace.

The images thus obtained are processed by electronics or by computing so as to extract information relating to the phenomenon observed. This information is used so that it can be introduced as input data for the furnace control algorithm so as to monitor and control the phenomenon observed, thus making it possible to perform an automatic analysis of the phenomena occurring inside the furnace in that part where melting and/or refining of the glass takes place.

The capabilities of the computer are used to integrate the processing of many parameters specific to the glass melting and/or refining process, something which is impossible at the present time using manual methods of controlling glass furnaces.

Among the advantages offered by the present invention, namely the automatic furnace control device forming the subject of the invention, mention may especially be made of the following:

furnace control is made independent of subjective perception by the operators and of their experience;

incorporation of all of the parameters of the glass-melting process, as well as the interaction of these various parameters;

optimization of furnace control;

better stability of furnace operation;

better control of transient chases;

better control of combustion, and therefore of consumption and discharge of pollutants;

better burner flame control;

better control of the distribution and delivery of power into the various zones of the furnace, and therefore of the glass refining;

optimum distribution between the various sources of energy supplied to the furnace, for example between fossil-fuel energy and electrical energy;

better use of glass-refining tools, such as bubblers or electrical boost melters for refining;

reduction in refractory wear by controlling the convention currents in the glass, thereby making it possible to extend furnace lifetime;

better control of end-product quality and improved end-product quality;

better repeatability of furnace adjustments for equivalent production runs;

reduced energy consumption; and reduced discharge of pollutants into the atmosphere.

Of course, it remains the case that the present invention is not limited to the embodiments described and/or shown here, rather it encompasses any variant thereof falling within the scope of the invention, as defined by the appended claims.

What is claimed is:

1. A system for controlling the melting of a glass batch in a glass melting furnace and comprising:

a plurality of sensors for detecting different types of operating conditions in a furnace including;

temperature information obtained from temperature sensors selectively set into or on the glass melting furnace;

information relating to flow rates and pressures of fluids used by the furnace including: fuel, oxidizer, fume as well as their compositions; cooling parameters, electricity; and the measurements of the consumption of each fluid, this information being delivered by sensors selectively provided in or on the furnace;

information regarding position of the various furnace actuators including: control valves, devices for varying electrical power, and batch flow rate;

information from end-of-travel sensors for the furnace;

set point values which are manually input by the operators into the furnace system;

information relating to quality of glass produced;

information from a neural network; and information coming from analysis of an image of the inside of the furnace;

means for creating, and analyzing images taken inside a furnace in accordance with a predetermined mathematical model;

a predictive network which, depending on the state of the furnace and information regarding changes in production over time, defines various set point values assigned to a plurality of furnace actuators of different types that affect a plurality of furnace operations;

means for storing operator set points corresponding to manual operation of furnace actuators under preselected conditions;

fuzzy logic controller means running a fuzzy logic control algorithm and connected at a plurality of respective inputs to the sensors, image means, predictive network, and operator set points storing means, the controller means generating a plurality of output signals for respective actuators that will control melting in the furnace including:

combustion equipment including burners with their fuel and oxidizer feed devices;

electrical equipment for heating;

glass refining devices including bubblers and boost melters; and wherein the furnace system operates in accordance with objectives defined by the operator set points; and the predictive network further including means for learning operating laws of the furnace during a learning phase, wherein the learning means defines the laws of different types of furnace operations, selectively from actual furnace operation, or by simulation of furnace operation using a mathematical model.

2. The system set forth in claim 1 wherein the means for creating, and analyzing images further comprises at least one video camera; and means for processing images obtained from the camera and producing information therefrom that is input to the algorithm.

3. The system set forth in claim 1 wherein the predictive network delivers information for defining the set points that are to be applied to actuators.

4. The system set forth in claim 2 wherein the camera is positioned in the furnace to observe the distribution of glass batch fed into the furnace, of the position of the batch piles and of their speed, and a plurality of parameters relating to the appearance of the batch as it melts on the surface of the glass melt.

5. The system set forth in claim 2 wherein the camera is positioned in the furnace to observe the shape and distribution of flames from burners inside the furnace.

6. The system set forth in claim 2 wherein the camera is positioned in the furnace to observe the movement of convection currents in the glass melt.

7. The system set forth in claim 2 wherein the camera is positioned in the furnace to observe the operation of bubblers in the furnace.

* * * * *